United States Patent [19]

den Brinker et al.

[11] 4,100,530

[45] Jul. 11, 1978

[54] CONTROLLED MECHANICAL SYSTEM

[75] Inventors: Carl S. den Brinker; Keith David Nicholls, both of Oakley, England

[73] Assignee: Texas Instruments Incorporated, Dallas, Tex.

[21] Appl. No.: 642,214

[22] Filed: Dec. 29, 1975

[51] Int. Cl.² ............................................. B60Q 9/00
[52] U.S. Cl. .................................. 340/53; 340/149 R; 235/92 CA
[58] Field of Search .................. 340/52 R, 53, 149 R, 340/213 Q; 235/92 CA, 92 CM

[56] References Cited
PUBLICATIONS

Electronics; Apr. 20, 1964; pp. 82–89.

Primary Examiner—Alvin H. Waring
Attorney, Agent, or Firm—Rene' E. Grossman; Richard L. Donaldson; James T. Comfort

[57] ABSTRACT

An electronic control system suitable for monitoring operation of an automatic automotive gearbox and for verifying actuation thereof in a correct manner. The control system includes stages corresponding to different gear positions, the stages being switchable between set and reset conditions. A control unit is operable to set a particular stage only when the next adjacent stage already is in a set condition. Electrical signals indicating the existing gearbox position are compared with signals defining which stage of the control system is set and operation of the control unit is inhibited if the compared signals do not correspond.

10 Claims, 4 Drawing Figures

| No. | Gearshift | Energised Actuators | | | |
|---|---|---|---|---|---|
| | | Initial State | Operation One | Operation Two | Operation Three |
| 1 | Neutral/Park to Inter | a | all off | b c | |
| 2 | Neutral/Park to High | a | all off | | |
| 3 | Reverse to Neutral or Park | a d | a | | |
| 4 | Reverse to Auto Low | a d | a | all off | b |
| 5 | Reverse to Manual Low | a d | all off | b | b d |
| 6 | Park/Neutral to Reverse | a | a d | | |
| 7 | Park/Neutral to Auto Low | a | all off | b | |
| 8 | Park/Neutral to Manual Low | a | all off | b | b d |
| 9 | Auto Low to Neutral | b | all off | a | |
| 10 | Auto Low to Intermediate | b | b c | | |
| 11 | Auto Low to Manual Low | b | b d | | |
| 12 | Intermediate to Neutral | b c | all off | a | |
| 13 | Intermediate to Auto Low | b c | b | | |
| 14 | Intermediate to High | b c | c | all off | |
| 15 | Intermediate to Manual Low | b c | b | b d | |
| 16 | High to Neutral | all off | a | | |
| 17 | High to Intermediate | all off | c | b c | |
| 18 | High to Auto Low | all off | b | | |
| 19 | High to Manual Low | all off | b | b d | |
| 20 | Manual Low to Intermediate | b d | b | b c | |
| 21 | Manual Low to Neutral | b d | b | all off | a |
| 22 | Manual Low to High | b d | b | all off | |
| 23 | Manual Low to Auto Low | b d | b | | |
| 24 | Manual Low to Reverse | b d | all off | a | a d |
| 25 | Auto Low to Reverse | b | all off | a | a d |

FIG. 3.

CONTROLLED MECHANICAL SYSTEM

This invention relates to a controlled mechanical system comprising a control system and a mechanism which is required to assume a plurality of different states at different times.

There are many kinds of mechanism which are required to assume different states in succession such as, for example, a chemical plant which has various reagents applied to it at different times and under different conditions for the purpose of manufacturing a particular product. Another kind of mechanism is an automatic gearbox such as is used in motor vehicles; in such a gearbox the different gears are brought into use by the selective operation of brakes and clutches operated electrically or hydraulically. It is important in such mechanism to ensure that before certain changes of state are made that previous changes of state have been completed correctly. In an automatic gearbox, for example, if one change of gear is not properly completed and another is carried out, then damage to the mechanism can be caused, for example, as a result of the incorrect operation of one or more of the clutches or brakes in the mechanism. Similarly in a chemical plant a process may require the subsequent feeding of incompatible gases to a chamber and if the first gas is inadequately flushed from the chamber when the second gas is applied then the product may be contaminated.

It is an object of the present invention to provide a controlled mechanical system in which the above difficult is overcome, the control system serving to monitor not only the operation of the mechanism but also its own operation.

According to the present invention there is provided a controlled mechanical system comprising a control system and a mechanism which is required to assume a plurality of different states at different times, the control system including a plurality of stages respectively corresponding to the different states required of the mechanism, a control unit for setting a selected stage only when adjacent (next in operational sequence) to a stage already set and initiating a corresponding change of state of the mechanism, connections between the stages of the control system for enabling the resetting of a previously set stage in response to the setting of an adjacent stage, means coupled to the mechanism for producing an indication of the state of the mechanism, means for comparing the indication of the state of the mechanism with the control system stage which is set and for inhibiting the operation of the control unit if they do not correspond.

Failures of the mechanism to complete change of state or in the setting of a stage corresponding to the new state required of the mechanism and the resetting of the previously set stage will both result in the inhibition of the control unit.

The controlled mechanism may include a means connected to the comparing means for producing an alarm indication if the state of the mechanism does not correspond to the stage of the control system which is set within a predetermined time interval after the initiation of a change of state of mechanism and the setting of another stage of the control system. Different periods of time may be required for the mechanism to complete different changes of state and the predetermined time intervals may be arranged to allow for the difference in these periods.

The changes of state of the mechanism may follow a simple linear sequence or a branched sequence, or may include closed loops of states. Moreover, the changes of state may be reversible in which case the stages of the control system must be settable in the reverse order.

In one example of the invention the mechanism is an automatic gearbox for a motor vehicle.

In order that the invention may be fully understood and readily carried into effect, it will now be described with reference to the accompanying drawings, of which:

FIG. 3 is a Table showing the changes of state required of the automatic gearbox.

Figure 1:
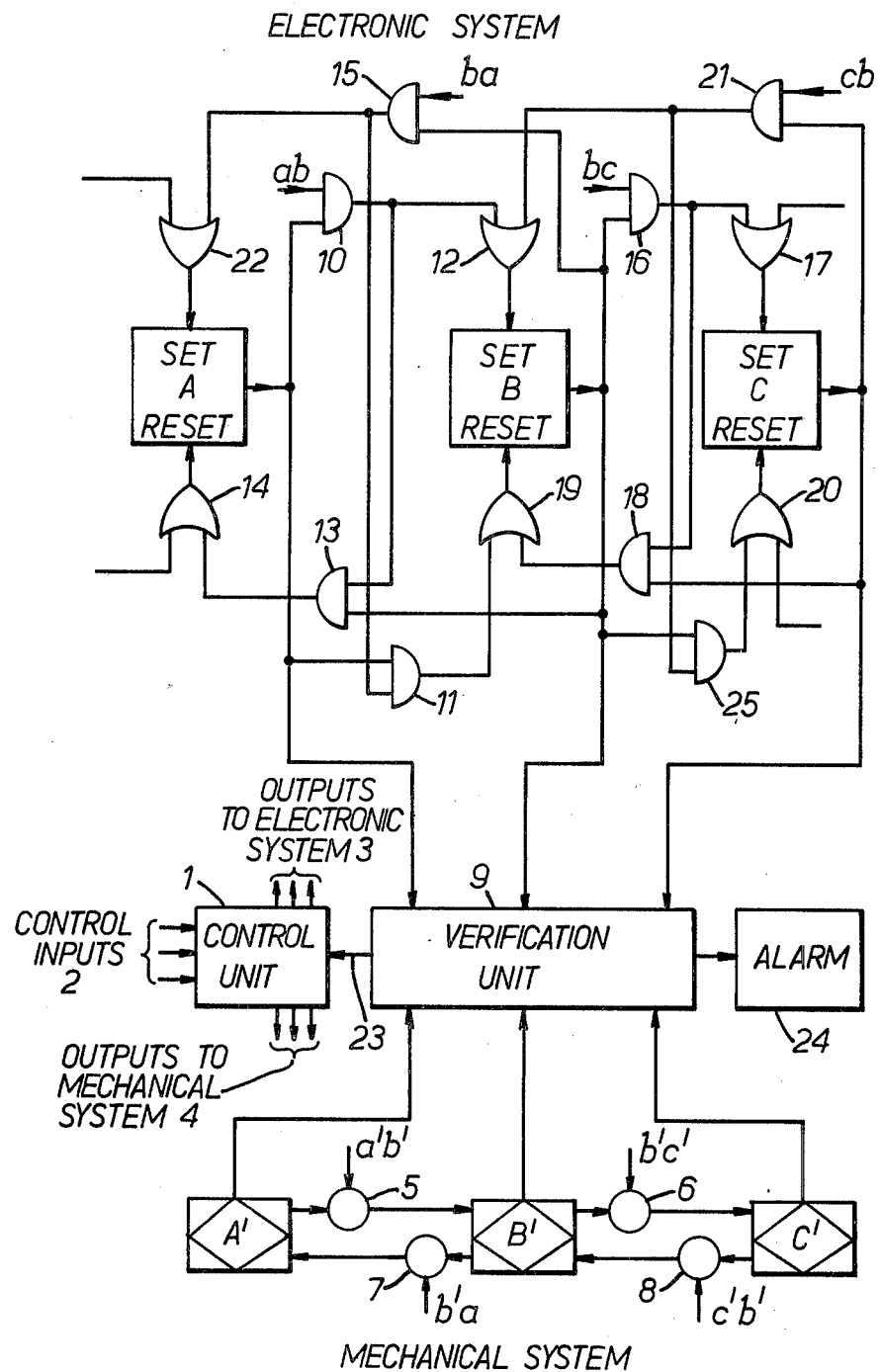
FIG. 1 is a diagram of a controlled mechanism according to the example of the invention.

Referring now to FIG. 1, the example of the invention shown includes an electronic control system consisting of three stages A, B, and C, and a mechanical system capable of assuming three states A', B' and C' corresponding respectively to the three stages of the control system. The actual components of the mechanical system are not indicated in FIG. 1, but it is assumed that suitable electrical components are provided in the mechanical system to provide the indications of the three states A', B' and C'. A control unit 1 is provided having inputs 2 from a control means, not shown, which provide the instructions to the controlled mechanism to assume a particular state or sequence of states. The unit 1 produces a first set of outputs 3 to the electronic system to effect the setting and resetting of the stages A, B, and C as required by the control inputs 2. The second set of outputs from the unit 1 is indicated by reference 4 and is used to effect the changes of state of the mechanical system.

Considering the mechanical system alone, the blocks A', B' and C' representing the three states of the system are coupled by elements 5, 6, 7 and 8, which are controlled respectively by signals $a'b'$, $b'c'$, $b'a'$, and $c'b'$ included in the outputs 4 of the control unit 1. As with the blocks A', B' and C', the elements 5, 6, 7 and 8 do not represent components of the mechanical system but the operations necessary to effect the corresponding changes of state. For example, the element 5 which responds to the signal $a'b'$ corresponds to, for example, mechanical valves, switches, solenoids and similar components necessary to change the state of mechanical system from that represented by the block A' to that represented by the block B'. Similarly the element 6 represents the operations necessary to change the state of the mechanical system from B' to C'. The element 7 represents the operations for changing the state of mechanical system from B' to A', and the element 8 represents the operations necessary to change the mechanical system from the state C' to the state B'. The mechanical system also includes switches or other kinds of sensor for providing indications of the state of the mechanical system, and in FIG. 1 three lines are connected respectively from the blocks A', B', and C' to a verification unit 9 to provide inputs to the verification unit when the mechanical system is in the states A', B' and C', respectively.

The electronic control system will now be considered. Each of the stages A, B, and C has a respective output which is connected as an input to the verification unit 9, so that the unit 9 is able to compare the state of the stages of the control system which is set with the state of the mechanical system. The output of the state A is also connected via an AND-gate 10 controlled by a signal ab and to an input of another AND-gate 11. The output of the AND-gate 10 is connected to an input of an OR-gate 12, the output of which is connected to the set input of the stage B, and also to an input of an AND-gate 13, the output of which is connected through an OR-gate 14 to the reset input of the stage A. The output of the stage B in addition to its connection to the verification unit 9 is connected to inputs of the AND-gate 13 and additional AND-gates 15, 16 and 25. The output of the AND-gate 16 is connected via an OR-gate 17 to the set input of the stage C and also to an input of an AND-gate 18. The outputs of the AND-gates 11 and 18 are applied via an OR-gate 19 to a reset input of the stage B. The output of the AND-gate 25 is connected via an OR-gate 20 to a reset input of the stage C. The output of the stage C in addition to being connected to the verification unit 9 is connected to an input of the AND-gate 18 and an input of another AND-gate 21, the output of which is connected to an input of the OR-gate 12 and an input of the AND-gate 25. The output of the AND-gate 15 is connected to an input of the AND-gate 11 and also through an OR-gate 22 to the set input of the stage A. The AND-gates 10, 15, 16 and 21 have respective inputs ab, ba, bc and cb from the outputs 3 of the control unit 1.

The operation of the control unit will now be described. Assume that the stage A is set and that the mechanical system is in the state A'. An input on 2 to the control unit 1 will cause a signal a'b' to be applied to the element 5 instructing the change of state to B' of the mechanical system and a signal ab to be applied to the AND-gate 10. Because the stage A is set the gate 10 produces an output signal which passes through the OR-gate 12 setting the stage B. At the same time the output of the gate 10 primes the AND-gate 13 so that when the stage B is set the gate 13 produces an output which passes through the OR-gate 14 causing the stage A to be reset. A similar sequence of operations occurs in response to the output signals ba, bc and cb as well. It will thus be apparent that the outputs 3 of the control unit 1 can cause different ones of the stage A, B and C to be set providing that the preceding stage in a particular sequence is already set. For example, the stage C could not be set unless the stage B were set, because with B reset the gate 16 would be closed and unable to produce an output signal.

The verification unit 9 is connected by a line 23 to the control unit 1 to inhibit the generation of output signals by the control unit 1 if the unit 9 does not receive corresponding input from the control system and the mechanical system. An alarm unit 24 is connected to the unit 9 for actuation if a discrepancy between the inputs from the control system and the mechanical system exists for more than a predetermined period of time. It will be appreciated that the control system being of an electronic construction will react substantially instantaneously to the control signals applied to it whereas the mechanical system by virtue of its nature will take longer to complete the corresponding change of state. Moreover, different changes of state may occupy different periods of time, and the unit 9 constructed to allow for these different periods so as not to cause the production of an alarm prematurely or permit a discrepancy between the control and mechanical systems to exist for longer than a predetermined period. The control system is constructed so that in the event of failure of one or other of its components it will not complete the setting of one stage and the reset of the previous stage, so that the unit 9 may receive inputs from more than one stage of the control system, and it is constructed to react to such a situation existing for longer than a short period of time likely to be taken for a previously set stage to be reset.

It will be apparent therefore that the control mechanism shown in FIG. 1 not only enables failures of the mechanical system to complete the change of state to be detected but it also can monitor the correct operation of the control system and can detect a breakdown in it. The example of the invention shown in FIG. 1 is a simple form to assist in the understanding of the invention. More complicated mechanical systems having more than three stages and/or including changes of state which are not reversible can be controlled in accordance with the invention.

Figure 2:
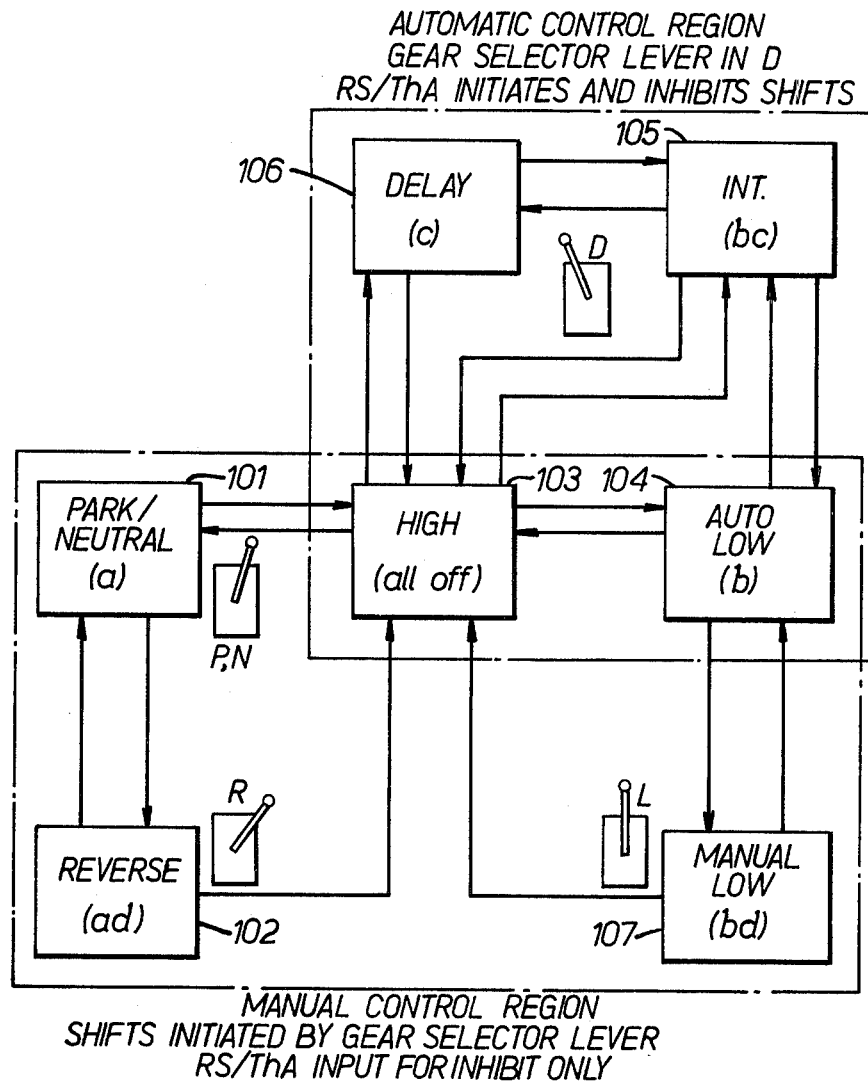
FIG. 2 is a functional diagram illustrating the stages of an automatic gearbox.
Figure 4:
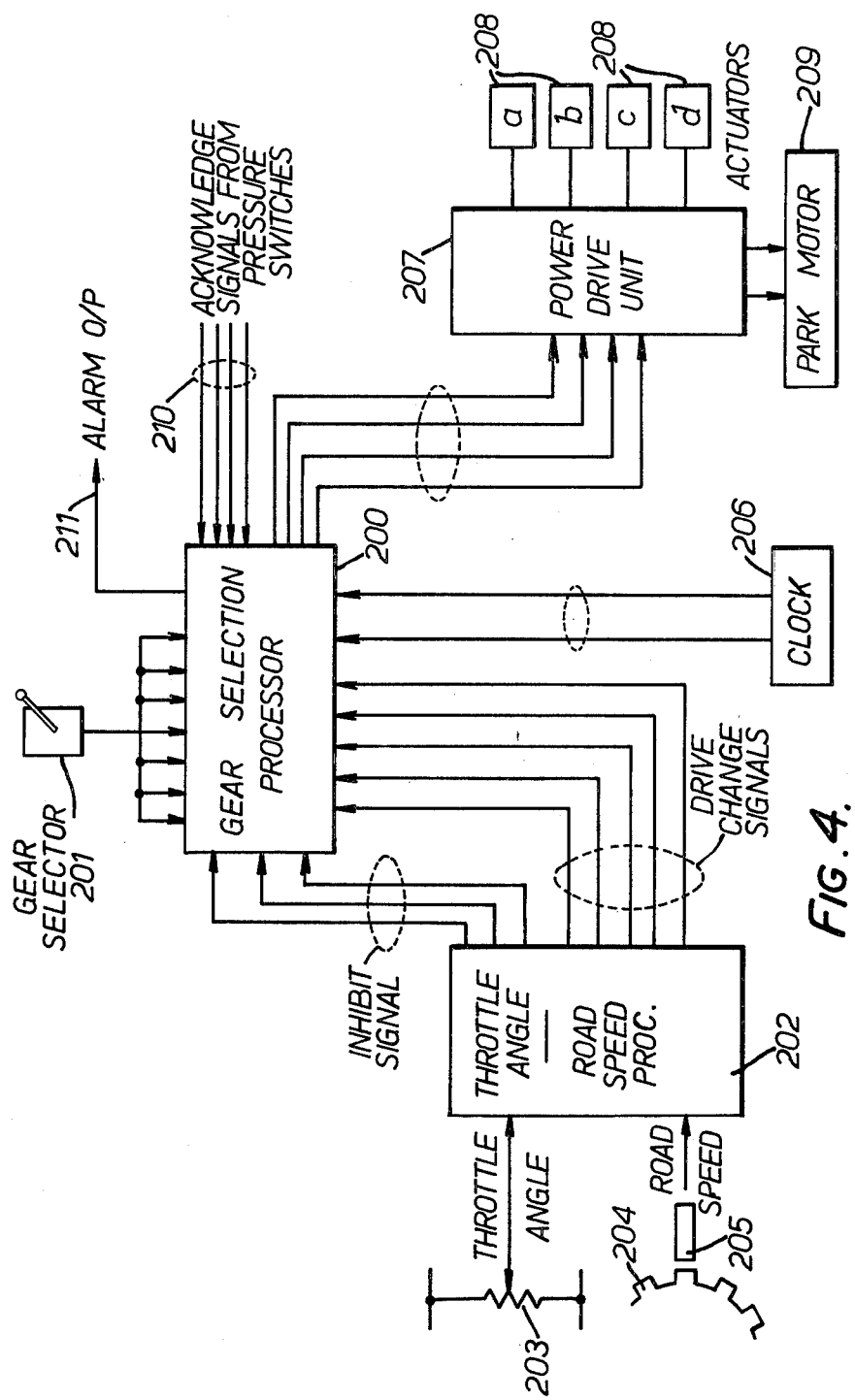
FIG. 4 is a block diagram of the components of the gearbox.

FIGS. 2, 3 and 4 relate to an automatic gearbox which is provided with a control system to produce a controlled mechanism according to the example of the invention.

In FIG. 2 the different states of the gearbox are shown as functional blocks. The block 101 which corresponds to the PARK/NEUTRAL condition (P/N) of the gearbox is connected by both forward and reverse paths to a block 102 corresponding to the REVERSE gear condition (R) of the gearbox and a block 103 corresponding to the HIGH gear condition (all off) of the gearbox. A single direction path is connected from the REVERSE gear block 102 to the high gear block 103, a block 104 labelled "AUTOLOW" is connected by both forward and reverse paths to the block 103 and an INTERMEDIATE gear block 105 is connected by both forward and reverse paths to blocks 103 and 104 and also to a DELAY (D) block 106. Forward and reverse paths interconnect the blocks 103 and 106. A block 107 labelled "MANUAL LOW" is connected by both forward and reverse paths to the block 104, and by a forward path to the block 103. The gearbox is operated by four hydraulic cylinders or solenoids, respectively labelled a, b, c and d. In the HIGH gear state, represented by the block 103, all four of these actuators are de-energized. In the PARK/NEUTRAL state (P/N) the actuator a alone is energized, in the AUTO LOW gear the actuator b alone is energized, and in the DELAY condition between INTERMEDIATE gear and HIGH gear the actuator c alone is energized. In INTERMEDIATE gear actuators b and c are both energized. In MANUAL LOW gear actuators b and d are both energized and in REVERSE gear actuators a and d are both energized.

From a consideration of FIG. 2, it will be apparent how an electronic control system of the kind described above with reference to FIG. 1 could be constructed to monitor the changes of state shown in FIG. 2 having a control system with eight stages corresponding respectively to the different states required of the gearbox and interconnected by gates in a manner corresponding to that indicated by the arrows in FIG. 2 and a control unit for setting the stages as required. Microswitches could be provided in the gearbox to provide the indications of its state in response to the positioning of the various parts of the gearbox. In the completed mechanism the control unit corresponding to the unit 1 (FIG. 1) would receive inputs from the gear lever in dependence upon its position and also from the angle of the throttle of the gear and the travel speed of a vehicle being driven via the gearbox, e.g., the road speed of a car.

The Table shown in FIG. 3 indicates the sequence of energization of the actuators a, b, c and d necessary to perform the changes of gear likely to be required of the gearbox during operation of the vehicle. It is not proposed to consider the conditions of road speed, throttle angle and gear lever position which would give rise to the requirement for these changes of gear, as these are well-known and have been fully discussed in many publications already.

From FIG. 3 it will be seen that changes of gear involve up to three operations, for example, and the control unit will be arranged to produce the necessary outputs in sequence as each operation is performed, but it will be understood that because of the inhibition of the control unit by the verification unit 9 each operation must be completed before the next operation is instructed. For example, supposing a change from REVERSE gear to MANUAL LOW gear were required, then unless the actuators a and d were both energized initially no change would take place and an alarm indication would already have been given. However, assuming that actuators a and d are correctly energized, then the first operation following selection of the MANUAL LOW function is the removal of energization from all actuators, putting the gearbox into HIGH gear. Then the actuator b is energized and finally the actuator d is energized in addition to the actuator b, thus completing the gear change. For gear changes from INTERMEDIATE gear to HIGH gear and from HIGH gear to INTERMEDIATE gear, the DELAY represented by the energization of the actuator c is employed for the purpose of rendering as smooth as possible the change between these two gears, as these are the changes most frequently used in driving the vehicle.

FIG. 4 shows in block diagrammatic form one possible construction of the gearbox. A gear selection processor 200 contains the electronic control system, the control unit and the verification unit shown in FIG. 1. Inputs to the control unit are applied to the processor 200 from a gear selector 201 which may, for example, have the usual positions park, reverse, neutral, drive and low (corresponding to the functional blocks of FIG. 2), and also from a road speed and throttle angle processor 202. The throttle angle information is applied to the processor 202 from a potentiometer 203 the position of the wiper of which is controlled by the throttle. The road speed information is derived from a toothed wheel 204 coupled to the road wheels of the vehicle and a sensor 205 which produces output pulses at a rate proportional to the speed of the vehicle. Clock pulses for controlling the operation of the system are derived from a clock pulse generator 206. Output signals from the processor 200 to effect the changes of gear are applied to a power drive unit 207 which effects the energization of four actuators 208 (a, b, c, d of FIG. 2). The power drive unit 207 also energizes a park motor 209 used to bring into action a braking or locking mechanism for holding the vehicle stationary when it is parked. The gearbox contains a number of microswitches which are operated when the actuators 208 are energized; these switches, which are not shown, provide acknowledgment signals on conductors 210 which are applied to the processor 200 and in that processor are fed to the verification unit (9 of FIG. 1) to enable the control unit to carry out further operations. An alarm output is generated by the processor 200 on a conductor 211 for operation of an alarm indicator when a failure of the kind described above occurs.

Although the invention has been described with reference to a specific embodiment in the form of an automatic gearbox it will be apparent that it could be applied to the monitoring of the operation of, for example, chemical plants and processes or mechanical devices in which different states are assumed in succession. The invention could also be applied to the monitoring of automated production lines.

What is claimed is:

1. A controlled mechanical system comprising a control system and a mechanism which is required to assume individual ones a plurality of different states at different times; said control system including a plurality of stages corresponding to the respective different states required of the mechanism, said stages having set and reset conditions; control unit means for setting a selected stage only when said selected stage is next in operational sequence to a stage already in a set condition and for initiating a corresponding change of state of said mechanism; means interconnecting the stages of said control system for enabling the resetting of a previously set stage in response to the setting of a stage next in operational sequence to said previously set stage; means coupled to the mechanism for producing an indication of the state of the mechanism; means for continuously comparing said indication of the state of the mechanism with the control system stage which is set and for inhibiting the operation of the control unit means in the event of non-correspondence.

2. A controlled mechanical system according to claim 1, wherein said means interconnecting said stages for enabling the resetting of a previously set stage in response to the setting of a stage next in operational sequence to said previously set stage includes gate means responsive to the set states of both said previously set stage and said next in sequence stage to apply a signal to reset said previously set stage.

3. A controlled mechanical system according to claim 1, further including means operably coupled to the stages of said control system for inhibiting operation of said control unit when two stages are concurrently set.

4. A controlled mechanical system according to claim 1, further including means for producing an alarm indication when the state of said mechanism does not correspond to a stage of said control system which has been set for a predetermined time interval.

5. A controlled mechanical system according to claim 4, wherein the duration of said predetermined time interval is selected in accordance with an expected time period needed by the mechanism to perform the particular change of state selected, and the time period for at least one change of state differs from the time period for at least another change of state.

6. A controlled mechanical system according to claim 1, wherein said means coupled to the mechanism for producing an indication of the state of the mechanism includes a plurality of conductors respectively corresponding to the possible states of the mechanism and means for selectively producing signals on said conductors to indicate the existing state of the mechanism.

7. A controlled mechanical system according to claim 1, wherein said mechanism is a motor vehicle automatic gearbox and said different states of the mechanism are different gear positions selectable in the gearbox.

8. A controlled mechanical system comprising a control system and a mechanism capable of selective operation to assume any of a plurality of different states;

means operably coupled to said mechanism for producing an indication of the existing state of said mechanism, said indicating means including a plurality of electrical conductors corresponding respectively to the said plurality of different stages, and means for selectively producing electrical control signals on said conductors to indicate the existing state of said mechanism;

said control system including a plurality of stages corresponding to the respective different stages of said mechanism, said stages having selectable set and reset conditions in which they produce respective set and reset signals;

control unit means for selectively setting a particular stage only when said particular stage is next in operational sequence to a stage already in a said set condition and for initiating a corresponding change of stage of said mechanism;

means interconnecting the stages of said control system for enabling the resetting of a previously set stage in response to the setting of a stage next in operational sequence to said previously set stage including gate means responsive to the set states of both said previously set stage and said next in sequence stage to apply a reset signal to said previously set stage;

comparator means for comparing said control signals indicating the existing state of said mechanism with the set signal produced by the particular control system stage in a set condition and form inhibiting operation of said control unit in the event of non-correspondence between said control signal and said set signal;

and means operably coupled to the stages of said control system for inhibiting operation thereof when two stages are concurrently set.

9. A controlled mechanical system according to claim 8, further including means for producing an alarm signal when the control signal corresponding to a particular state of said mechanism does not correspond to said stage of said control system which has been in a said set condition for a predetermined period, said predetermined period corresponding with an expected period needed by said mechanism to perform the particular change of state selected, said predetermined period differing from the time period required for at least another change of state of said mechanism.

10. A controlled mechanical system according to claim 8, wherein said mechanism is a motor vehicle automatic gearbox and said different states of the mechanism are different gear positions selectable in said gearbox.

* * * * *